United States Patent [19]
Lagoutte et al.

[11] Patent Number: 5,636,047
[45] Date of Patent: Jun. 3, 1997

[54] OPTICAL INTERCONNECTION SYSTEM

[75] Inventors: Pierre Lagoutte, Issy Les Moulineaux; Luigi D'Auria, Sceaux, both of France

[73] Assignee: Thomson-CSF, Paris, France

[21] Appl. No.: 495,255

[22] Filed: Jun. 27, 1995

[30] Foreign Application Priority Data

Jul. 1, 1994 [FR] France ................................. 94 08157

[51] Int. Cl.$^6$ .................................................. H04B 10/00
[52] U.S. Cl. .......................... 359/163; 359/133; 359/124; 385/14
[58] Field of Search ............................ 359/124, 127–128, 359/152, 163, 133; 385/14, 24; 257/81–82, 84

[56] References Cited

U.S. PATENT DOCUMENTS

| 4,870,637 | 9/1989 | Follett et al. ............................. 359/163 |
| 5,448,661 | 9/1995 | Takai et al. ............................. 359/152 |

FOREIGN PATENT DOCUMENTS

| 0 496 674 A1 | 7/1992 | European Pat. Off. . |
| WO86/05649 | 9/1986 | WIPO . |

OTHER PUBLICATIONS

Journal of Lightwave Technology., vol. 11, No. 5/6, May/Jun. 1993, New York, pp. 1088–1093 H. Toba et al "A Demand–Assign Optical Frequency–Division–Multiple–Access Star Network".

IEEE Global Communications Conference Globecom '93, vol. 2, Nov. 29, 1993, Houston, Texas, pp. 1169–1175 G.I. Papadimitriou et al "Learning Automata–Based Random Access Protocols for WDM Passive Star Networks".

*Primary Examiner*—Wellington Chin
*Assistant Examiner*—Kinfe-Michael Negash
*Attorney, Agent, or Firm*—Oblon, Spivak, McClelland, Maier & Neustadt, P.C.

[57] ABSTRACT

An optical interconnection circuit includes a fixed number (N) of interconnected circuits (C1 to C16). Each circuit has an optical emitter (E1 to E16) and at least one optical receiver (R1, R16). The emitter outputs an optical wavelength which is specific to the circuit on which it is located. An optical coupler (CE) connects the emitter in each circuit to all receivers in the other circuits and each circuit (C1 to C16) has an address for identifying that particular circuit. The value of this address is applied to the emitter to adjust the optical wave length at which the emitter operates.

9 Claims, 2 Drawing Sheets

OPTICAL INTERCONNECTION SYSTEM

BACKGROUND OF THE INVENTION

This invention concerns an optical interconnection system, particularly applicable to the interconnection of several electronic circuit boards to allow them to communicate between each other.

Information exchange in optical form between electronic boards is attractive due to the transmission speed that increases the throughput, and because it eliminates all constraints on distances between boards and is immune to parasites.

Telecommunications links within a campus area**** are served mainly by dedicated Subscriber Connection Units called hubs, located in technical rooms on the sites to be connected. These hubs interconnect subscribers, mostly at 10 Mbits/sec. at the present time, in clusters of 10 to 100 (1 to 16 boards each handling 8 to 16 or more subscribers). Since access technologies are improving, the binary throughput available in practice is tending to increase (proposals for 25, 50 and 100 Mbits/sec.). The effect of this situation is to incite a need for global exchanges in hub back panels, increasing from 300/500 Mbits/sec. (current situation) to 2/10 Gbits/sec. (1995 situation). Induced exchanges take place between hub boards in a manner which is not very predictable (standard implementation); each board can generate up to 500/1000 Mbits/sec at peak flow, and exchanges may be multicast (several boards receiving at the same time). Current implementations (up to 4 Gbits/sec.) prefer "all electric" solutions on bus 1 to N, each board transmitting alone on part of the bus (statically), while all others are listening. The electrical technology can carry between 20 and 50 Mbits/sec. through each connector point, and problems of back panel characteristic impedance become severe as the throughput increases; in practice it is necessary to connect high density miniature connectors with several hundreds of pins, and a large area of copper for implementation of line drivers/receivers.

Technically, the interconnection need is waiting for a renewal of these solutions in the form of an optical emission architecture in the back panel enabling the interconnection of 16 boards, each capable of sending up to 1 Gbits/sec. to one or several other boards at a given instant.

SUMMARY OF THE INVENTION

Therefore, the invention concerns an optical interconnection system consisting of:
 a determined number of circuits to be interconnected, each circuit including an optical emitter and at least one optical receiver, the emitter on one board emitting at an optical wave length specific to this circuit;
 an optical coupler connecting the emitter in each circuit to all receivers in the other circuits.

Each circuit has an address that identifies it, the value of this address being applied to the board emitter to adjust the optical wave length at which the emitter emits.

It is essential that the solution in the invention allows the use of standard boards in all physical emitter and receiver locations in the back panel. Each board is capable of acquiring its location number, if necessary, by electrically reading the back panel.

This is why the invention also concerns a system in which each circuit to be interconnected is made on one board, the various boards being plugged into at least one connector, the address information of the circuit being supplied through this connector.

The invention allows for standardization of boards, for their design and for the position of the various elements on the board.

This is why the invention also concerns a system including the following in each given circuit:
 one receiver for each circuit, each receiver being efficient for the emission wave length of one circuit only, and outputting a current on reception of this wave length;
 a switch, controlled by the address information, connecting the receiver which is efficient at the wave length emitted by the emitter in the same given circuit, to an electric current detector which controls a circuit which adjusts the wave length at which the emitter emits until it emits on an appropriate wave length.

BRIEF DESCRIPTION OF THE DRAWINGS

The various purposes and characteristics of the invention will be more easily understood by reading the following description and the figures in the appendix which represent.

DETAILED DESCRIPTION OF THE INVENTION

Figure 1:
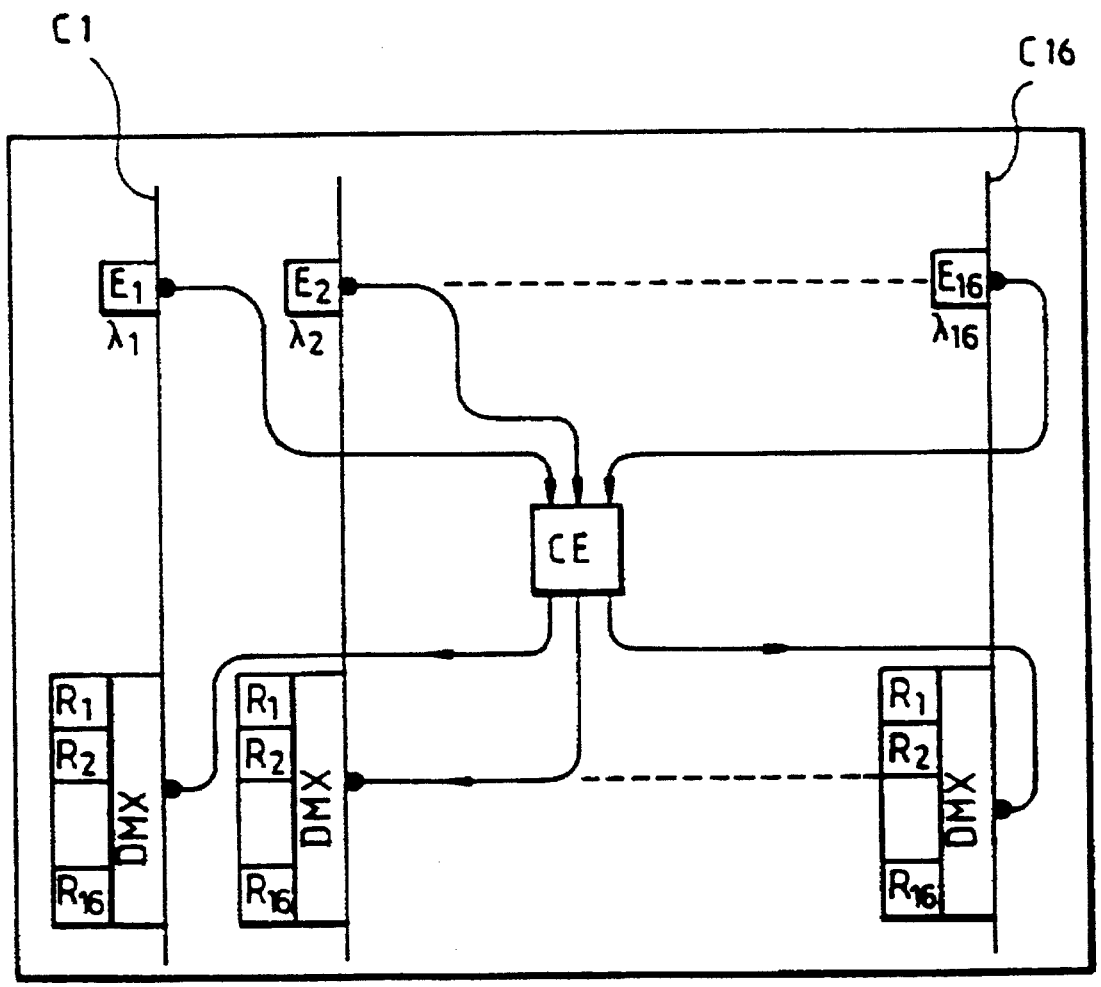
FIG. 1, a general example of how to make the system described in the invention.

Referring to FIG. 1, we will firstly describe a simplified example of how to make the interconnection system according to the invention.

The objective is to interconnect N boards, each board being capable of exchanging information with the other boards simultaneously. The conventional interconnection architecture is to place one emitter and N receivers on each of the N boards and to connect each emitter through N links to N receivers with the corresponding rank on each board. Therefore the number of links is equal to $N^2$, or 256 for 16 boards. In the invention, this number of links is reduced to 2N.

The architecture of the invention is shown on FIG. 1. In this example, it is assumed that N=16 boards. Each board C1 to C16 includes an emitter E1 for board C1, E16 for board C16, etc., N receivers and an optical demultiplexer DMX1 to DMX16. Emitters E1 to E16 have different emission wave lengths corresponding to the value of the filters forming the optical demultiplexers. The 16 emitters E1 to E16 are connected through 16 optical fibers to the 16 inputs of a star coupler CE with 16 inputs and 16 outputs. This coupler acts as multiplexer and optical distributor; each of the 16 output fibers terminating at demultiplexers located on each board, simultaneously transfers signals modulating optical emitters carried by the 16 different wave lengths.

The coupler CE is made using known techniques. The document "Efficient Multi-Channel Integrated Optics Star Coupler on Silicon" by C. Dragone et al published in IEEE Photonics Technology letters, vol 1, NO 8, August 1989, pp 241-243, contains an example of how to make this type of coupler.

Demultiplexers DMX1 to DMX16 on each board then spatially separate the 16 wave lengths $\lambda i$ and direct them in parallel to the 16 receivers which in turn output the 16 signals output by optical emitters.

In this case, the number of links is reduced to 2N, namely 32 for 16 boards, each board only containing 2 optical connectors.

All boards contain identical components and sub-assemblies located in the same positions. Only the wave lengths output by the optical emitter are different on different boards.

Figure 2:
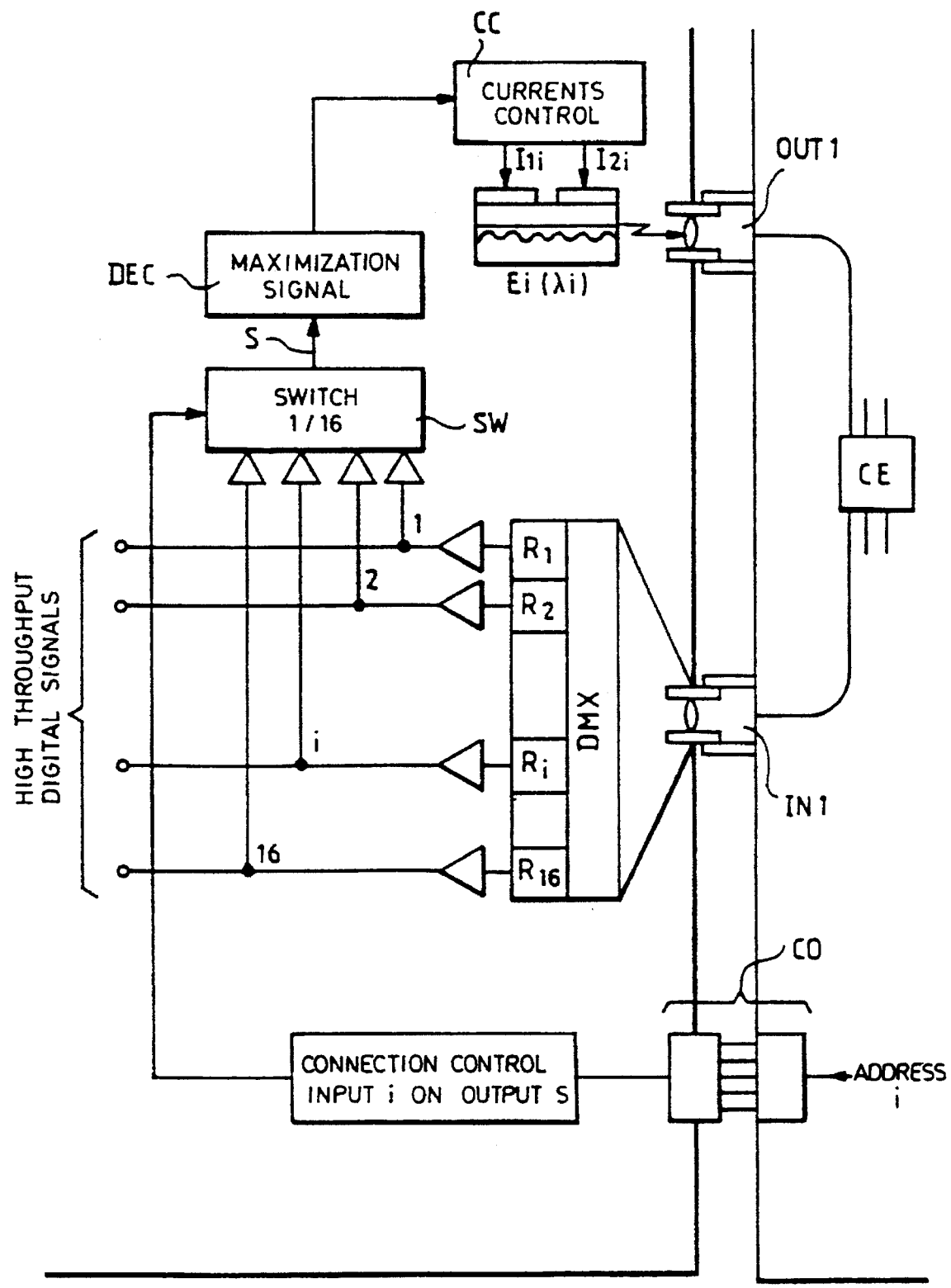
FIG. 2, a detailed example of how to make the system described in the invention.

According to the invention, boards C1 to C16 can be standardized by calling electrically matchable laser diodes for emitters, for which the wave length will automatically be adjusted to the value corresponding to the rank of the board when the board is plugged into the back panel. The device shown on FIG. 2 is suggested for this purpose.

Address i depends on a known parameter such as the board position. For example, the board address i is supplied to the board through the back panel via an electrical connector CO. This address will control an electrical switch SW with N inputs and one output, in other words, on FIG. 2, with 16 inputs and one output. Each input may receive the average level output by each receiver R1 to R16 obtained after demodulation in DMX, amplification and integration of detected optical signals. The address i sent to the switch SW connects the output S to the receiver rank i, Ri. The average level output by Ri available in S then controls an electronic detector circuit, DEC, acting on adjustment circuit CC which controls currents $I1i$ and $I2i$ injected into laser diode Ei, so as to maximize the optical power output by Ei.

An emitter such as Ei may be made as described in the "Frequency Tunable Semiconductors Laser" document by S. Murata et al published in Optical and Quantum Electronics, 22, (1990), pp. 1–15. In this type of emitter, it is planned to adjust the emission wave length by adjusting the value of the control current(s).

A demultiplexer DMX may be made as described in the document "Practical Realization of a High Density Diode-Coupled Wavelength Demultiplexer" by G. J. Cannell, published in the IEEE Journal on Selected Areas in Communications, vol 8, No. 6, August 1990, pp 1141–1145.

This type of demultiplexer can receive several wave lengths on a single input (optical connector IN1 on FIG. 2). It deflects the various wave lengths in different directions such that a wave originating from board C1 is deviated to receiver R1, a wave originating from board C2 is deviated to receiver R2, etc. and a wave originating from board C16 is deviated to receiver R16.

In this construction example, it is assumed that receivers R1 to R16 on each board are numbered in the same way as the boards. In this way, receivers R1 on the various boards are capable of receiving the optical wave emitted by the emitter on board C1, etc.

Under these conditions, the system operates as follows:

The various boards (C1 to C16) are plugged into their connector such as CO on FIG. 2. The connector CO outputs address information, possibly contained in connector CO or possibly originating from a remote device not shown. This address information is input to a switch SW. The switch is put in a position corresponding to this information and connects the receiver with the same rank to the output S.

For example for board C1, the switch SW is put in position 1 and connects receiver R1 to output S.

When the emitter on a board has to emit information, it works as follows:

For example, when emitter E1 on board C1 has to emit, the optical signal that it emits (through the optical connector OUT1) is sent to demultiplexers on all boards C1 to C16. In particular, it is emitted to demultiplexer DMX1 on its own board C1. Remember that in this board C1, the receiver R1 is connected to the output S through switch SW.

If it is assumed that the optical wave output by emitter E1 is not at the wave length normally assigned to emitter E1, the receiver R1 will not detect this wave. Therefore detector DEC will not detect any current on the output S from receiver R1. Detector DEC then controls the adjustment circuit CC which varies the control currents $I1i$ and $I2i$ on the emitter laser diode E1. When the emitter Ei emits the appropriate wave length at a sufficient power level, receiver R1 on board C1 detects it (in the same way as receivers R1 on the other boards). Receiver R1 outputs a sufficient signal to switch SW and therefore to detector DEC. The detector detects the signal and outputs a control signal to the adjustment circuit CC so that it will maintain the adjustment that has just been obtained. To allow the emitter on each board to adjust itself to the right emission wave length, there is therefore an optoelectronic counter reaction loop passing through star coupler CE through emitter Ei and receiver Ri associated with its filter (optical demultiplexer) which has two advantages:

it adjusts the wave length of the laser emitter to the value corresponding to the rank of the board, it maintains the emitted optical power to the maximum set level.

In one example of construction, there are 16 boards to be interconnected.

Therefore, 16 matchable multielectrode laser diodes are provided, for example in which the wave lengths are servocontrolled at a separation of 0.5 nm emitting in an 8 nm spectrum within the 1500 nm (or 1300 nm) optical fiber emission window. These laser diodes can be varied up to a throughput of 1 Gbits/sec. and emit average optical powers of the order of +3 dBm, at least half of which is coupled in each single mode optical fiber terminating at the star coupler CE.

For the star coupler CE, for dimensional reasons, it is preferred to use an integrated optical version with 16 inputs and 16 outputs as described in the C. Dragone document mentioned above, but any other coupler type would also be possible.

The insertion loss for this type of planar coupler is less than 3 dB, the distribution uniformity is of the order of 1 dB, and the distribution loss for 16 channels corresponds to 12 dB.

For the demultiplexer, the device described in the G. J. Cannel document mentioned above will be used, which combines an optical demultiplexer designed from a network and a monolithic module with 16 GaInAs/InP photodiodes assembled in opto-hybrid form, in the same "dual in line" package with one fiber optic input. The network dispersion will be adapted to a resolution of 0.5 nm. The sensitivity of this device may be better than −25 dBm for a throughput of 1 Gbits/sec. and an error ratio of $10^{-9}$.

A system designed using these components will have the following performances:

| | |
|---|---|
| Optical Power emitted by an emitter Ei | +3 dBm |
| Transmitter/fiber coupling loss | −3 dB |
| Back panel optical connection loss | −1 dB |
| CE insertion loss | −3 dB |
| CE distribution | −12 dB |
| Back panel optical connection loss | −1 dB |
| Optical power per channel received by the demultiplexer/receiver | −17 dB |
| Sensitivity of the demultiplexer/receiver by channel | −25 dB |
| Margin | +8 dB |

This margin may be used if necessary to reduce the error ratio and to simplify the pre-amplification stage.

The invention concerns the optical interconnection of boards in equipment. In order to reduce the number of links between boards, the star coupler and optical multiplexing principle is adopted, each board being equipped with an optical source emitting a distinct wave length. Standardization of boards is achieved by automatic adjustment of this wave length to the value corresponding to the rank i of the board, using a servocontrol loop maximizing the optical power emitted based on the electrical signal output by the photo diode associated with the filter rank i of the optical demultiplexer. This photodiode and the emitter are connected by allocating the rank of the board when it is plugged in.

This system can be applied to remote terminals connected through a star optical network multiplexed in wave length.

We claim:

1. Optical interconnection system, comprising:

a fixed number of circuits to be interconnected, each circuit including an optical emitter and at least one optical receiver, the emitter located on a board emitting at an optical wave length specific to this said each circuit;

an optical coupler connecting the emitter in each circuit to all receivers in other circuits;

wherein each circuit has an identifying address, a value of said address being applied to the board emitter to adjust the optical wave length at which the emitter emits and wherein the address is supplied to a circuit by an external device as a function of the rank of said circuit from among said fixed number of circuits to be interconnected.

2. System according to claim 1, wherein each circuit to be interconnected is made on one board, each board being plugged into at least one connector (CO), the address of the circuit being supplied from said at least one connector.

3. System according to claim 1, wherein the address is contained in said at least one connector.

4. System according to claim 2, wherein the connector is wired so as to adapt an address supplied by an external circuit, to the board connected to said each circuit.

5. System according to claim 1, wherein it includes the following in each specific circuit (for example C1):

one receiver for each circuit, each receiver operating for the emission wave length of a single circuit, and outputting a current on reception of this wave length;

a switch, connecting receiver which operates at the wave length emitted by emitter in the same given circuit to an electric current detector which controls a circuit that adjusts the emission wave length of the emitter until it emits at an appropriate wave length, under the control the address information.

6. System according to claim 5, wherein the detector emits a specific control signal to the adjustment circuit until it receives a signal with a sufficient level from the emitter.

7. System according to claim 5, wherein each circuit includes a switch with one output and as many inputs as there are receivers, and which can connect one input to one output towards the detector.

8. System according to one of claims 1 or 7, wherein it includes a wave length demultiplexer (DMX) connected to the coupler, receiving the different wave lengths emitted by emitters in the various circuits and switching each wave length to a specific receiver.

9. System according to claim 8, wherein each circuit is made on one board, the various boards being plugged into a connector which provides address information to the circuit and in which the connector, the demultiplexer (DMX), receivers, switch, detector the adjustment circuit the emitter are in identical positions on the different boards.

* * * * *